(12) United States Patent  
Min et al.

(10) Patent No.: US 7,804,564 B2
(45) Date of Patent: Sep. 28, 2010

(54) WIDE ANGLE DIFFUSER HAVING A PLURALITY OF MICROLENSES AND A PLURALITY OF PRISMS HAVING A TRUNCATED PYRAMID SHAPE AND LCD EMPLOYING THE SAME

(75) Inventors: Jee-hong Min, Seongnam-si (KR); Moon-gyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 11/774,625

(22) Filed: Jul. 9, 2007

(65) Prior Publication Data

US 2008/0049165 A1 Feb. 28, 2008

(30) Foreign Application Priority Data

Aug. 24, 2006 (KR) .................. 10-2006-0080718

(51) Int. Cl.
*G02F 1/1335* (2006.01)
*F21V 7/04* (2006.01)

(52) U.S. Cl. .................. 349/112; 349/95; 349/64; 362/620

(58) Field of Classification Search ............... 349/112, 349/63, 64, 95; 362/620, 626
See application file for complete search history.

(56) References Cited

U.S. PATENT DOCUMENTS

| 5,396,350 | A | * | 3/1995 | Beeson et al. ............... 349/62 |
| 6,606,133 | B1 | * | 8/2003 | Okabe .................. 349/65 |
| D493,251 | S | * | 7/2004 | Yu et al. .................. D26/122 |
| D494,704 | S | * | 8/2004 | Yu et al. .................. D26/122 |
| 6,835,961 | B2 | * | 12/2004 | Fukayama ............... 257/84 |
| 2005/0140860 | A1 | * | 6/2005 | Olczak .................. 349/112 |
| 2006/0146562 | A1 | * | 7/2006 | Ko et al. .................. 362/561 |

FOREIGN PATENT DOCUMENTS

KR 2006-0032690 A 4/2006

\* cited by examiner

*Primary Examiner*—Andrew Schechter
*Assistant Examiner*—Michael Inadomi
(74) *Attorney, Agent, or Firm*—Sughrue Mion, PLLC (57) ABSTRACT

Provided is a wide angle diffuser including a plate-shaped body, a plurality of microlenses, and a plurality of prisms. The plate-shaped body has an incident surface on which light is incident and an exit surface through which light is emitted form the plate-shaped body. The microlenses and the prisms are respectively disposed on one of the incident surface and the exit surface. Also provided is a liquid crystal display including a liquid crystal panel, a backlight unit, provided on a rear surface of the liquid crystal panel, which emits collimated light to the liquid crystal panel, and the wide angle diffuser diffusing light passing through the liquid crystal panel.

16 Claims, 13 Drawing Sheets

WIDE ANGLE DIFFUSER HAVING A PLURALITY OF MICROLENSES AND A PLURALITY OF PRISMS HAVING A TRUNCATED PYRAMID SHAPE AND LCD EMPLOYING THE SAME

CROSS-REFERENCE TO RELATED PATENT APPLICATIONS

This application claims priority from Korean Patent Application No. 10-2006-0080718, filed on Aug. 24, 2006, in the Korean Intellectual Property Office, the disclosure of which is incorporated herein in its entirety by reference.

BACKGROUND OF THE INVENTION

1. Field of the Invention

Apparatuses consistent with the present invention relate to a wide angle diffuser and a liquid crystal display (LCD) employing the same, and more particularly, to a wide angle diffuser which can diffuse light that is collimated by passing the light through a liquid crystal panel to obtain a sufficient viewing angle, and a liquid crystal display (LCD) employing the same.

2. Description of the Related Art

In a conventional LCD, the light supplied to a liquid crystal panel is diffuse light. The liquid crystal panel performs a shutter function to transmit or block light by changing the polarization direction of linearly polarized input light. When diffuse light is used, a degree of change in the polarization direction varies according to the direction in which the light is incident so that a contrast ratio varies according to a viewing direction.

Even though the decrease of the contrast ratio can be restricted using a phase difference film, in an LCD achieving a viewing angle of 170°, the contrast ratio in the vertical direction is about several thousand to one, but is reduced to ten to one at an angle of 85° on the left/right side. Consequently, in an LCD supplying diffuse light to the liquid crystal panel, the display quality of a display device is considerably deteriorated at large angles. Also, to secure the viewing angle, a liquid crystal mode compensating for the deterioration in the performance of liquid crystal using a viewing angle compensation film or a variety of methods such as an IPS (in plane switching) mode, a VA (vertical alignment) mode, and an OCB (optical compensated bend) mode is provided. However, these solutions may increase costs due to the decrease in aperture ratio and increase in the number of manufacturing steps.

Thus, to solve the problem occurring when the diffuse light is incident on the liquid crystal panel, there is an increasing demand for an LCD having a structure in which collimated light is supplied to the liquid crystal panel and transmitted perpendicularly through the liquid crystal panel and having a diffuser to secure a viewing angle characteristic.

SUMMARY OF THE INVENTION

To solve the above and/or other exemplary problems, the present invention provides a wide angle diffuser which can obtain a sufficient viewing angle by diffusing collimated light transmitted through a liquid crystal panel when applied to an LCD in which collimated light is supplied to the liquid crystal panel, and an LCD employing the same.

According to an aspect of the present invention, a wide angle diffuser comprises a plate-shaped body having an incident surface on which light is incident and an exit surface through which light is emitted from the plate-shaped body. A plurality of microlenses are arranged on one of the incident surface and the exit surface, and a plurality of prisms, which diffuse light, are arranged on the other one of the incident surface and the exit surface.

The microlenses may comprise a mixture of microlenses having different sizes. The microlenses may have spherical or aspherical surfaces. The microlenses may be hemispherical lenses having spherical or aspherical surfaces. The microlenses may have a uniform size. The prisms may comprise prisms having different apex angles or the same apex angle. At least some of the prisms may comprise a plane portion substantially parallel to the plate-shaped body. At least some of the prisms may have a truncated pyramid shape.

According to another aspect of the present invention, a liquid crystal display comprises a liquid crystal panel, a backlight unit provided on a rear surface of the liquid crystal panel and emitting collimated light to the liquid crystal panel, and a wide angle diffuser diffusing light passing through the liquid crystal panel. The wide angle diffuser comprises a plate-shaped body having an incident surface on which light is incident and an exit surface through which light is emitted from the plate-shaped body. A plurality of microlenses are arranged on one of the incident surface and the exit surface of the plate-shaped body, and a plurality of prisms, which diffuse light, are arranged on the other one of the incident surface and the exit surface. The wide angle diffuser may include any of the above-described features.

In the wide angle diffuser the prisms may be arranged on the incident surface and the microlenses may be located on the exit surface.

The liquid crystal display may further comprise an adhesive layer which attaches the prisms of the wide angle diffuser to the liquid crystal panel and an optical coating layer to cover the micro lenses of the wide angle diffuser.

The liquid crystal display may further comprise an optical coating layer to cover the microlenses of the wide angle diffuser.

BRIEF DESCRIPTION OF THE DRAWINGS

The above and other exemplary aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

Figure 1:
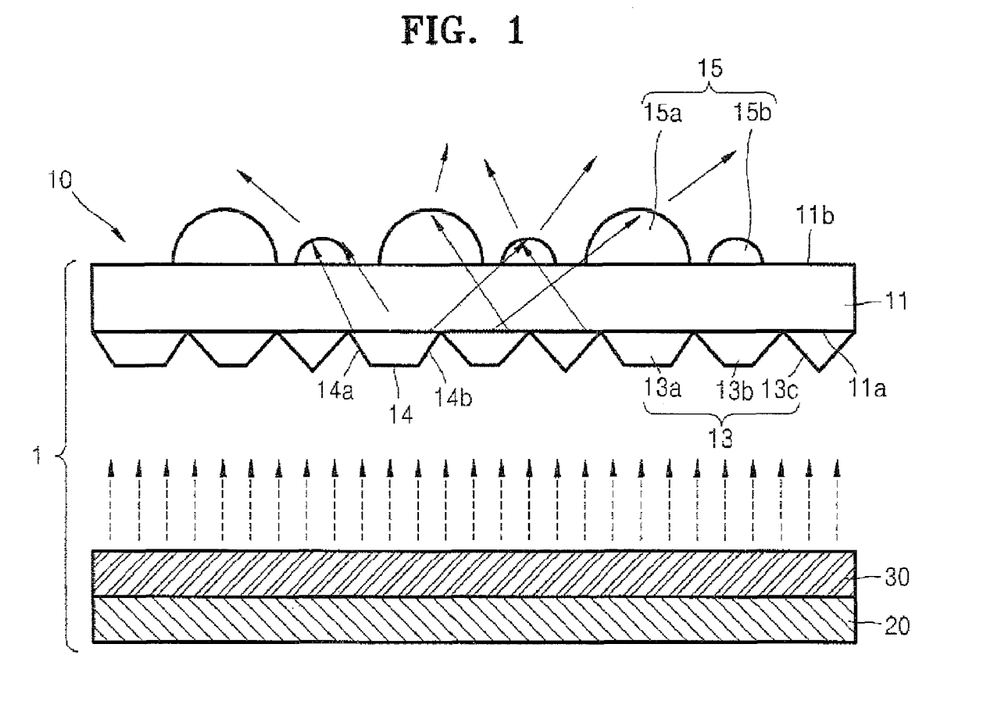
FIG. 1 is a view of a wide angle diffuser according to an exemplary embodiment of the present invention and an LCD employing the same.

FIG. 1 is a view of a wide angle diffuser 10 according to an embodiment of the present invention and a liquid crystal display (LCD) 1 employing the same. Referring to FIG. 1, the wide angle diffuser 10 includes a plate-shaped body 11 that is transparent, a plurality of microlenses 15 arranged on one of an incident surface 11a of the plate-shaped body 11 on which light is incident and an exit surface 11b of the plate-shaped body 11 where light exits, and a plurality of prisms 13 arranged on the other one of the incident surface 11a and the exit surface 11b where the microlenses 15 are not formed. Overall, the LCD 1 includes a liquid crystal panel 30, a backlight unit 20 provided at a rear surface of the liquid crystal panel 30 and emitting collimated light to the liquid crystal panel 30, and the wide angle diffuser 10 diffusing the light emitted from the liquid crystal panel 30.

In FIG. 1, the wide angle diffuser 10 has a structure in which the prisms 13 are arranged on the incident surface 11a on which light is incident from the liquid crystal panel 30, and the microlenses 15 are arranged on the exit surface 11b facing away from the liquid crystal panel 30. In the wide angle diffuser 10 according to the present embodiment, the microlenses 15 can be formed in a spherical or aspherical shape. For example, the microlenses 15 can be formed as hemispherical lenses having a spherical or aspherical shape. The microlenses 15 can be a mixture of microlenses 15a and 15b having different sizes.

Figure 2:
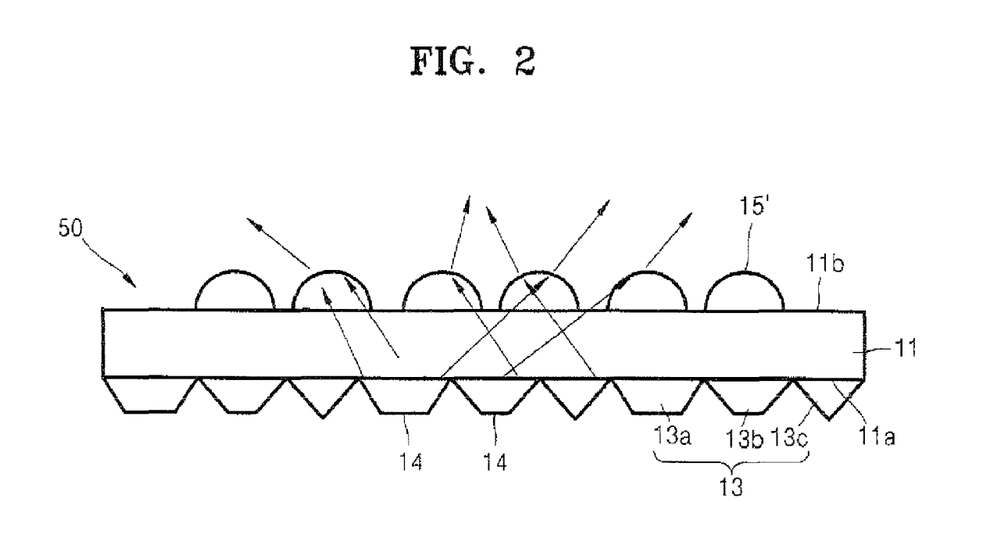
FIGS. 2 through 5 are views of wide angle diffusers according to other exemplary embodiments of the present invention.

Alternatively, as shown in FIG. 2, a plurality of microlenses 15' can be formed to have the same size. In this case, the microlenses 15' can be formed as hemispherical lenses having a spherical or aspherical surface. FIG. 2 shows a wide angle diffuser 50 according to another embodiment of the present invention which can be applied instead of the wide angle diffuser 10 of FIG. 1. In FIGS. 1 and 2 and other drawings for other embodiments described later, constituent elements that are substantially the same have the same reference numerals and descriptions of the same elements will be omitted.

The prisms 13, as shown in FIGS. 1 and 2, can be formed of a plurality of prisms 13a, 13b, and 13c having different apex angles. Some of the prisms 13, that is, the prisms 13a and 13b, have a plane portion 14 formed by cutting off the apex portion. For example, the prisms 13a and 13b may have a truncated pyramid shape, for example, a triangular truncated pyramid shape, a tetragonal truncated pyramid shape, or a polygonal truncated pyramid, shape. In FIGS. 1 and 2, some of the prisms 13, that is, the prisms 13a and 13b, have the plane portion 14 and additional prism 13c having pointed tip are also used. However, all of the prisms 13 may have the plane portion 14. In the prism 13a having the plane portion 14, for example, the apex angle corresponds to an imaginary angle made by extending two inclined surfaces 14a and 14b that are inclined with respect to the plane portion 14.

Figure 3:
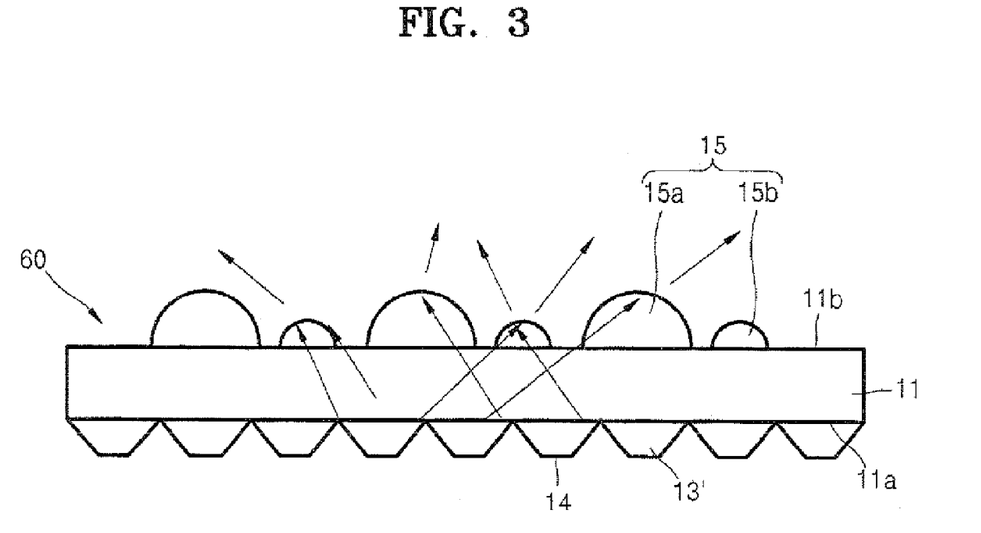
Figure 4:
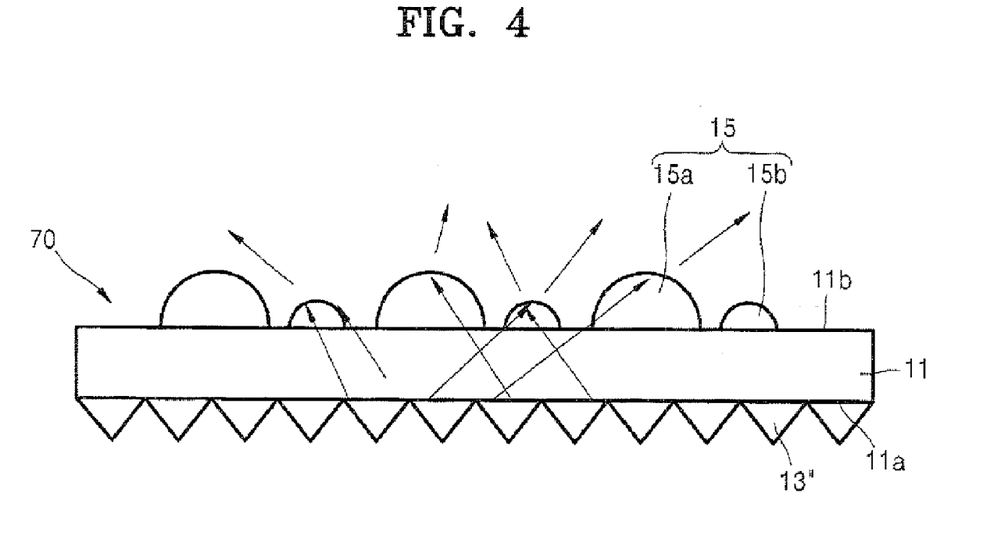
Figure 5:
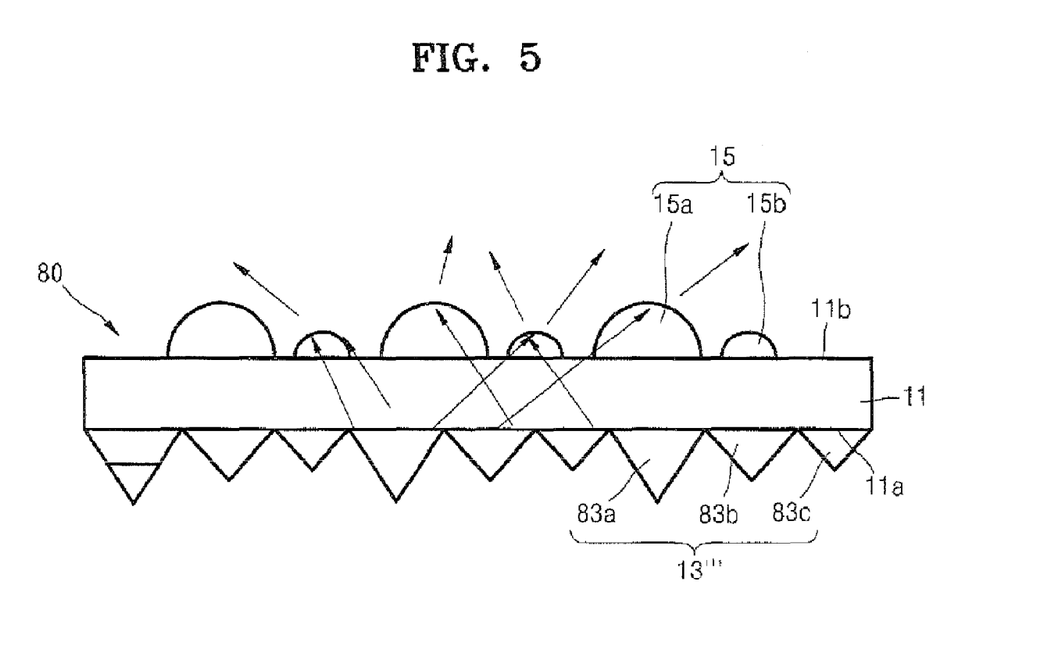

FIGS. 3 through 5 show wide angle diffusers 60, 70, and 80 according to other embodiments of the present invention which can be applied instead of the wide angle diffuser 10 of FIG. 1. The wide angle diffusers 60, 70, and 80 correspond to various modifications of the prisms 13 which can be applied to the wide angle diffuser 10 according to the present invention.

As shown in FIGS. 3 and 4, a plurality of prisms 13' and 13" may have the same apex angle. FIG. 3 shows an example in which the apex angles of the prisms 13' are the same and at least some of prisms 13' have the plane portion 14 formed by cutting off an apex portion. However, all prisms 13' may have the plane portion 14. Although the prisms 13' have the same apex angle, some of the prisms 13' may have the plane portion 14 formed by cutting off an apex portion and the others may have no plane portion. Since this case corresponds to the case of FIG. 1, except that the prisms 13 all have the same apex angle, an illustration thereof will be omitted.

FIG. 4 shows an embodiment in which the prisms 13" all have the same apex angle and no plane portion. In this case, the prisms 13" may have a pyramid shape such as a triangular pyramid shape, a tetragonal pyramid shape, or a polygonal pyramid shape. FIG. 5 shows an embodiment in which the prisms 13''' are prisms 83a, 83b, and 83c having different apex angles and no plane portion. In this case, the prisms 13''' may have a pyramid shape such as a triangular pyramid shape, a tetragonal pyramid shape, or a polygonal pyramid shape.

FIGS. 3 through 5 show cases in which the microlenses 15 are a mixture of microlenses 15a and 15b having different sizes. Alternatively, the microlenses 15' of FIG. 2 having the same size may be provided to FIGS. 3 through 5. Since modified examples can be sufficiently deduced from FIGS. 1 through 5 ("deduced by combining various elements of FIGS. 1-5), illustrations thereof will be omitted.

Referring to FIGS. 1 through 5, the prisms 13, 13', 13", and 13''' are arranged on the incident surface 11a of the wide angle diffusers 10, 50, 60, 70, and 80 while the microlenses 15 or 15' are arranged on the exit surface 11b of the wide angle diffusers 10, 50, 60, 70, and 80. Conversely, the microlenses 15 or 15' can be arranged on the incident surface 11a of the wide angle diffusers 10, 50, 60, 70, and 80 while the prisms 13, 13', 13", and 13''' can be arranged on the exit surface 11b of the wide angle diffusers 10, 50, 60, 70, and 80. Since such arrangements are obtained by merely inverting the wide angle diffusers 10, 50, 60, 70, and 80 of FIGS. 1 through 5, illustrations thereof will be omitted.

Figure 6:
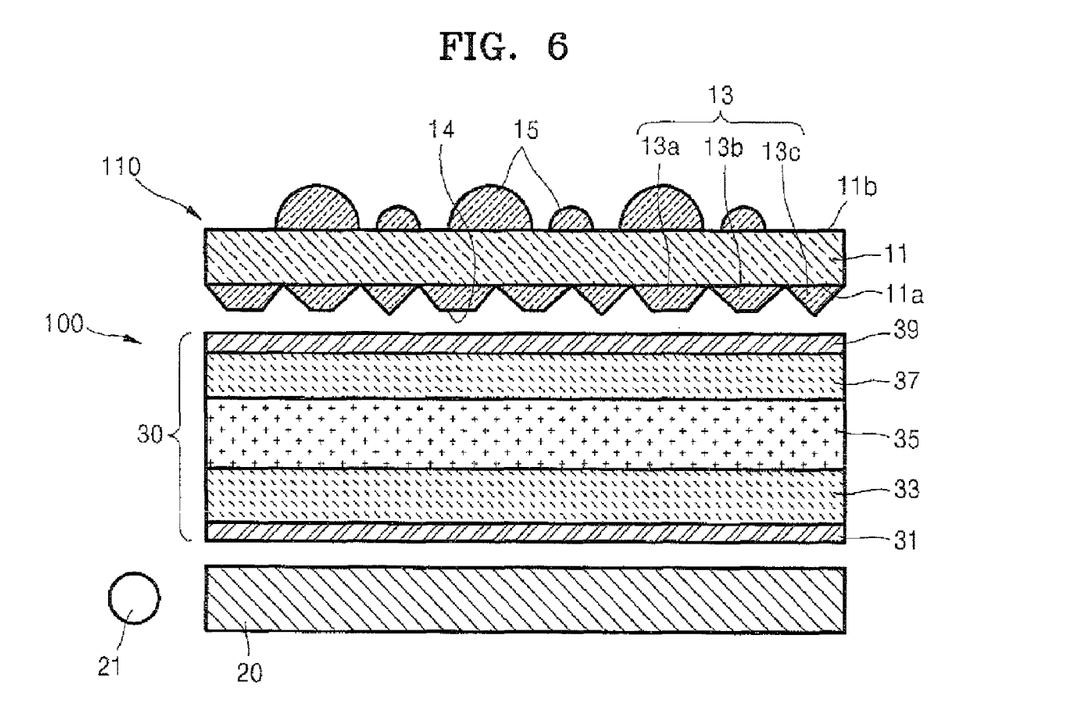
FIGS. 6 through 9 are views of LCDs according to other exemplary embodiments of the present invention.

A variety of embodiments of the LCD 1 employing the wide angle diffuser according to the present invention will be described below. FIG. 6 shows an LCD 100 according to an embodiment of the present invention. Referring to FIG. 6, the LCD 100 includes the liquid crystal panel 30, the backlight unit 20 provided at the rear surface of the liquid crystal panel 30 and emitting collimated light to the liquid crystal panel 30, and a wide angle diffuser 110 diffusing the light passing through the liquid crystal panel 30. The wide angle diffuser 110, which is separately manufactured, is assembled to the liquid crystal panel 30.

The liquid crystal panel 30 includes first and second transparent substrates 33 and 37, a liquid crystal layer 35 located between the first and second transparent substrates 33 and 37, a first polarization plate 31 provided as a polarizer on a rear surface of the first transparent substrate 33 to allow only light having a particular linear polarization of the light emitted by the backlight unit 20 to be incident on the liquid crystal layer 35, and a second polarization plate 39 provided as an analyzer on a front surface of the second transparent substrate 37.

The backlight unit 20 is provided to collimate light emitted by a light source 21. The collimated light is perpendicularly incident on the liquid crystal panel 30 and passes through the liquid crystal panel 30. Theoretically, the light emitted from the backlight unit 20 and incident on the liquid crystal panel 30 is totally collimated so that the overall light is parallel light. However, since it is substantially difficult to make totally collimated light, the backlight unit 20 may be formed to collimate the light so that the ratio of a parallel beam with respect to the total light emitted to the entire surface of the liquid crystal panel 30 is over an appropriate level. The appropriate level of the parallel beam ratio can be determined considering design limits, manufacturing limits, and manufacturing costs. The appropriate level should lie within a certain range of levels that can improve the quality of a display device as desired by solving a problem that the contrast ratio varies according to a viewing direction because a degree of change in the polarization direction changes with respect to the direction in which light is incident (on a liquid crystal panel) in a general LCD in which diffusing light is supplied to the liquid crystal panel.

A backlight unit disclosed in U.S. patent application Ser. No. 11/526,045 filed on 25 Sep. 2006 by the subject applicant and incorporated herein by reference, for example, can be used as the backlight unit 20.

The wide angle diffuser 110 diffuses the light collimated and passing through the liquid crystal panel 30 so that an image has the same quality no matter which direction it is viewed from. Thus, the wide angle diffuser 110 is provided to secure a diffusion angle large enough to produce an image having the same contrast ratio at any angle. The wide angle diffuser 110, as shown in FIGS. 1 through 5, has a structure in which the microlenses 15 are arranged on one side of the transparent plate-shaped body 11 and the prisms 13 are arranged on the other side thereof.

FIG. 6 shows an example of the wide angle diffuser 110 in which the prisms 13 are arranged on the incident surface 11a and the microlenses 15 are arranged on the exit surface 11b. In FIG. 6, the wide angle diffuser 10 shown in FIG. 1 is provided as the wide angle diffuser 110. However, any of the wide angle diffusers 50, 60, 70, and 80 shown in FIGS. 2 through 5 can be provided as the wide angle diffuser 110.

As shown in FIG. 6, when a wide angle diffuser in which at least some of the prisms have the plane portion is used as the wide angle diffuser 110 and the prisms are arranged on the incident surface of the wide angle diffuser, the wide angle diffuser 110 may be directly attached to the liquid crystal panel 30.

Figure 7:
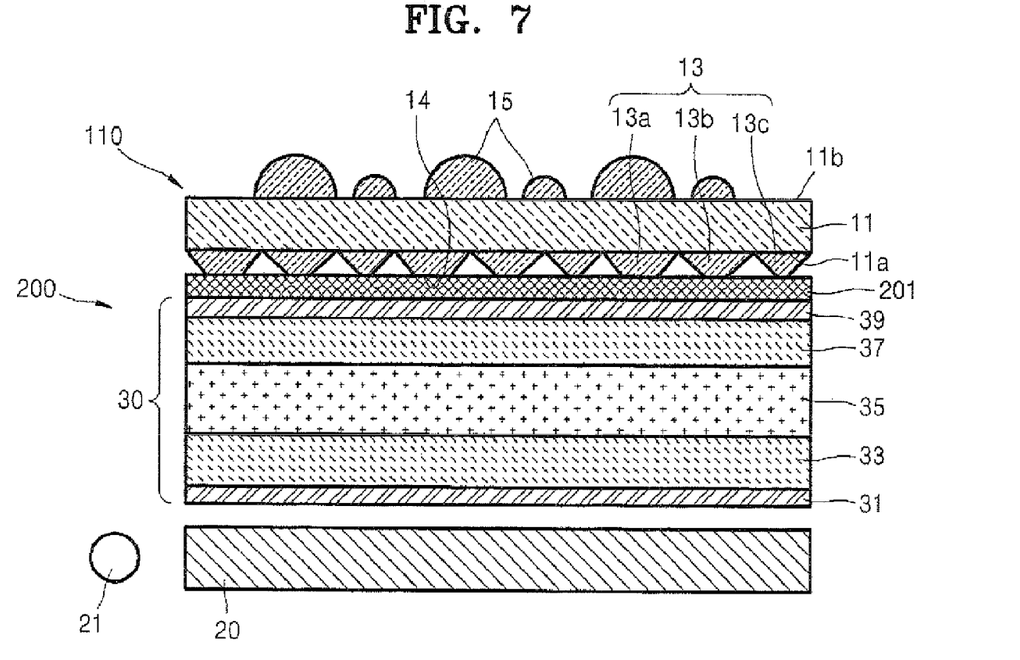

FIG. 7 shows an LCD 200 according to another embodiment of the present invention. Referring to FIG. 7, the LCD 200 includes the liquid crystal panel 30, the backlight unit 20 provided at the rear surface of the liquid crystal panel 30 and emitting collimated light to the liquid crystal panel 30, and the wide angle diffuser 110 diffusing the light passing through the liquid crystal panel 30. The wide angle diffuser 110 is incorporated with the second polarization plate 39 using an adhesive when the second polarization plate 39 is manufactured. That is, an adhesive layer 201 to attach the wide angle diffuser 110 to the liquid crystal panel 30 is further provided.

To enable the attachment of the wide angle diffuser 110 to the second polarization plate 39 of the liquid crystal panel 30 using the adhesive layer 201, the wide angle diffuser 110 may have the prisms 13 arranged on the incident surface 11a which light is incident from the liquid crystal panel 30 and the microlenses 15 arranged on the exit surface 11b apart from the liquid crystal panel 30, and at least some of the prisms 13, that is, the prisms 13a and 13b, may have the plane portion 14 obtained by cutting off an apex portion. That is, any of the wide angle diffusers 10, 50, and 60 of FIGS. 1 through 3 can be provided as the wide angle diffuser 110. FIG. 7 shows an example in which the wide angle diffuser 10 of FIG. 1 is provided as the wide angle diffuser 110.

Figure 8:
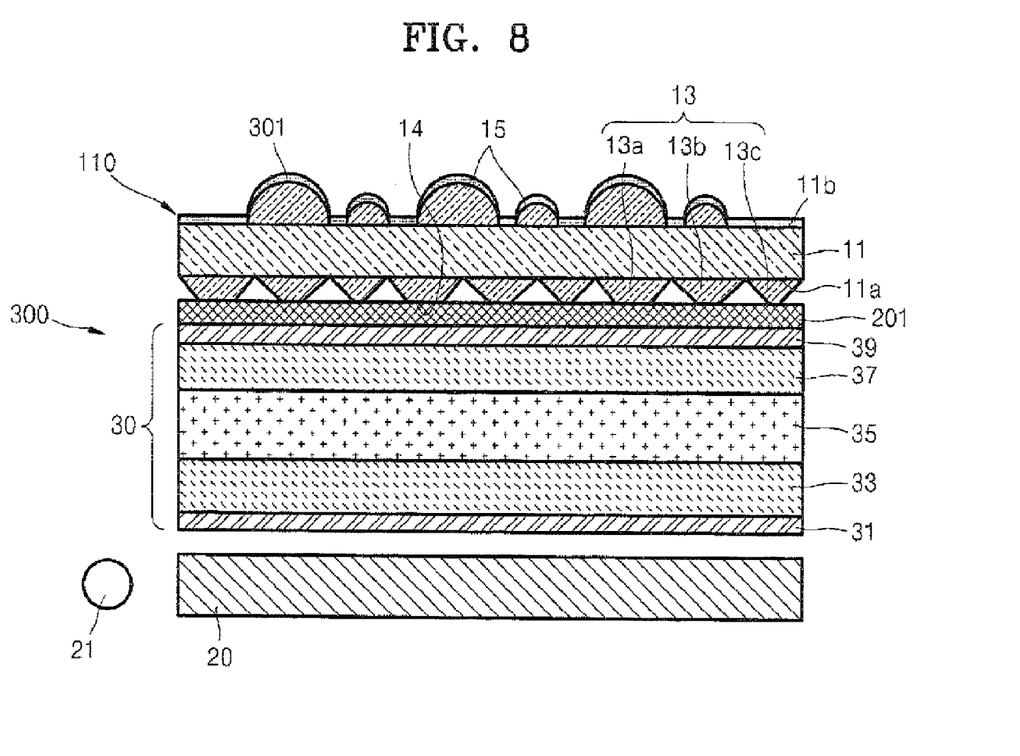

FIG. 8 shows an LCD 300 according to yet another embodiment of the present invention. Compared to the LCD 200 of FIG. 7, a characteristic feature of this embodiment is an optical coating layer 301 disposed on the microlenses 15 of the wide angle diffuser 110. In FIG. 8, the same reference numerals as those in FIG. 7 indicate the same constituent elements.

Figure 9:
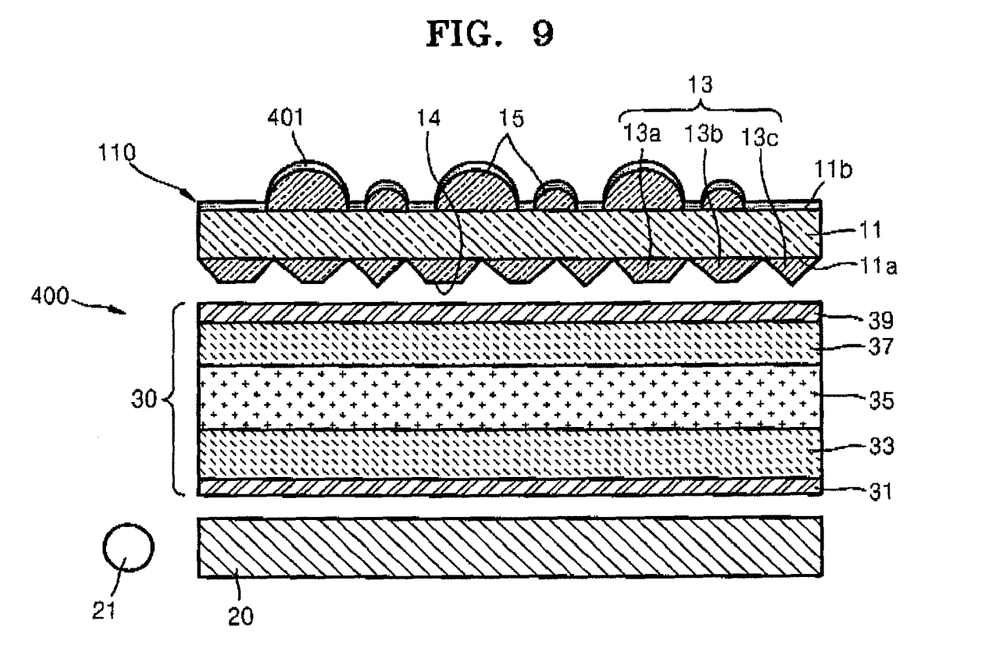

FIG. 9 shows an LCD 400 according to another embodiment of the present invention. Compared to the LCD 100 of FIG. 6, a characteristic feature of this embodiment is an optical coating layer 401 disposed on the wide angle diffuser 110.

In FIG. 9, the same reference numerals as those in FIG. 6 indicate the same constituent elements. In FIG. 9, the optical coating layer 401 covers the microlenses 15 of the wide angle diffuser 110. However, when the microlenses 15 are arranged on the incident surface 11a and the prisms 13 are arranged on the exit surface, the optical coating layer 401 may be formed to cover the prisms 13. The optical coating layers 301 and 401 of FIGS. 8 and 9 provide physical protection and provide anti-reflection and anti-glare functions.

According to the LCDs 100, 200, 300, and 400 according to the various embodiments of the present invention, since the collimated light from the backlight unit 20 is emitted to the liquid crystal panel 30 and the light passing through the liquid crystal panel 30 is diffused by the wide angle diffusers 10, 50, 60, 70, and 80 according to the present invention, a light beam can be diffused at all angles so that a large viewing angle and a very uniform contrast distribution in all direction can be obtained.

Figure 10:
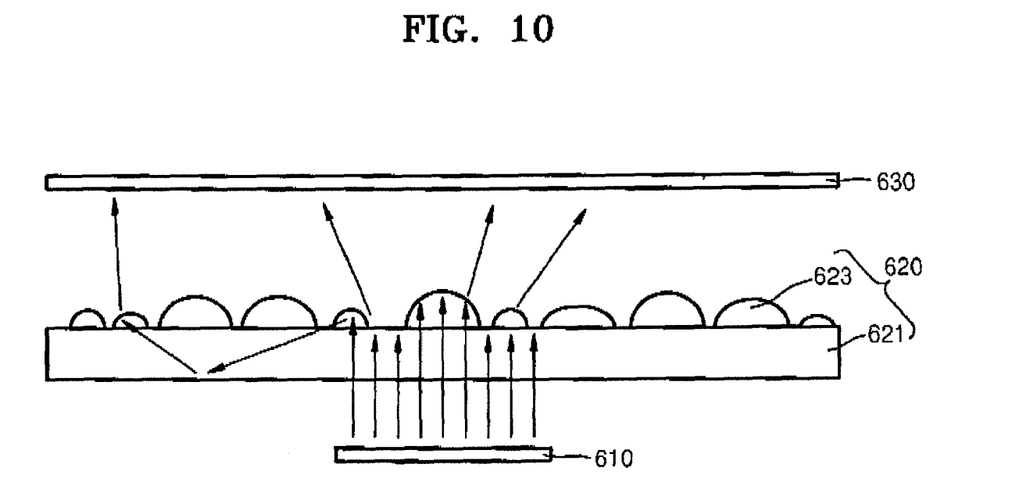
FIG. 10 is a view showing a detection structure for analyzing the light intensity with respect to the emission angle of exit light when a diffuser has a plurality of microlenses having different sizes formed on only one surface of a transparent plate, as a comparative example.

The result of a simulation in which the wide angle diffusers according to the various embodiments of the present invention are used is described below. FIG. 10 shows a detection structure for analyzing the light intensity distribution with respect to the emission angle of exit light for a diffuser 620 in which a plurality of microlenses 623 having different sizes are formed on one surface of a transparent plate 621 and nothing is formed on the other surface, as a comparative example. A surface light source 610 having a predetermined size and emitting collimated parallel light emits light to the diffuser 620. The light diffused by the diffuser 620 is detected by a photodetector 630 having a large light receiving range in order to detect the light intensity distribution with respect to a light emission angle.

Figure 11:
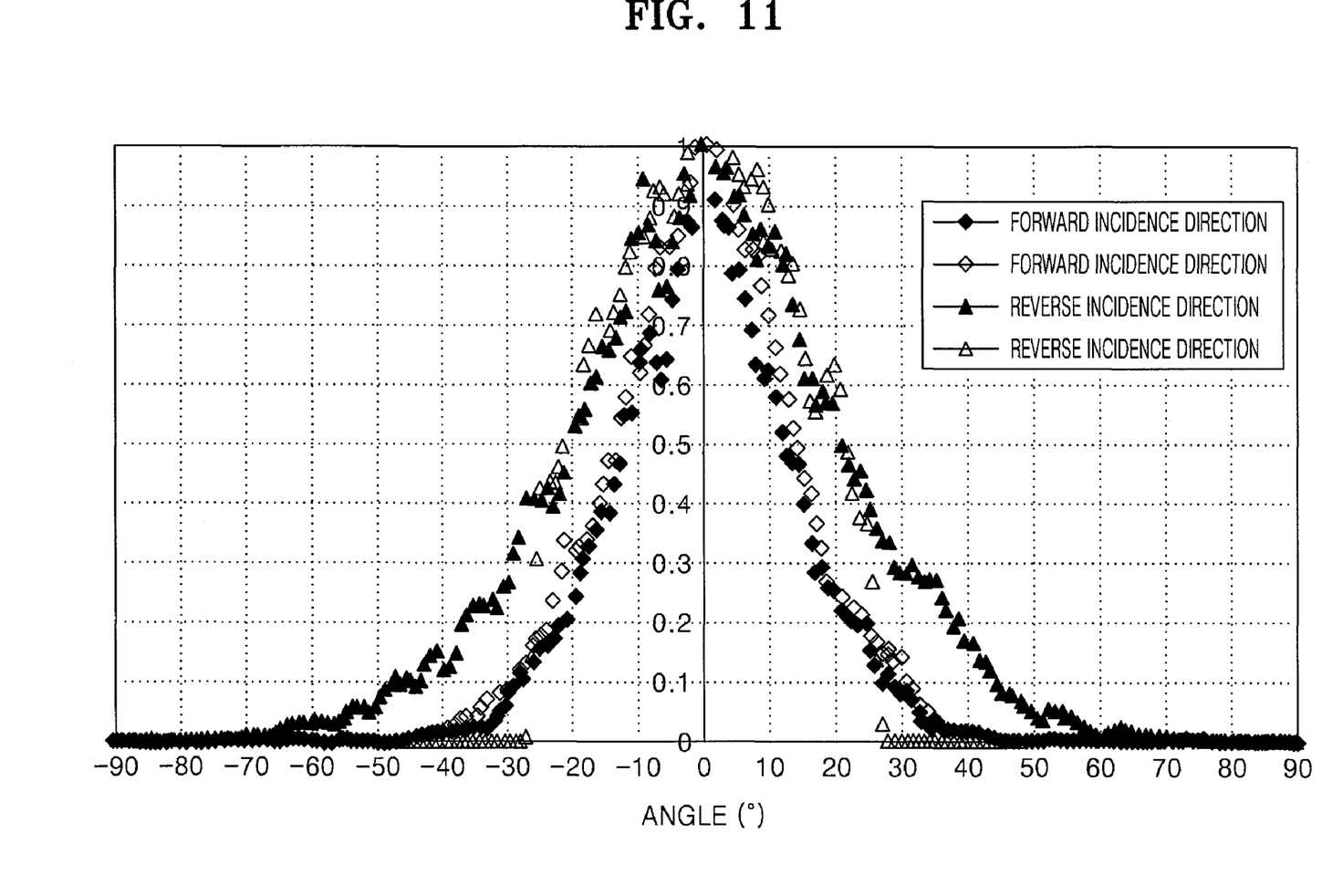
FIG. 11 is a plot of the light intensity with respect to the emission angle of light transmitted through the diffuser of FIG. 10 in the forward and reverse directions.

FIG. 11 shows the light intensity distribution with respect to the emission angle of light transmitted through the diffuser of FIG. 10 in the forward and reverse directions. When light is incident in a forward direction, i.e., the collimated light emitted from the surface light source 610 passes through the transparent plate 621 and is then incident on the microlenses 623, the range of angle satisfying the full width at half maximum (FWHM) of the light intensity distribution is ±10°. When the diffuser 620 of the FIG. 10 is flipped so that light is incident in a reverse direction, i.e., the collimated light emitted from the surface light source 610 passes through the microlenses 623 and is then incident on the transparent plate 621, the range of angle satisfying the full width at half maximum (FWHM) of the light intensity distribution is ±20°. The transmissivity/reflectance of a front incident light for the forward incidence direction is 42.4/56.7 and the transmissivity/reflectance of the front incident light for the reverse incidence direction is 93.7/5.9.

Although the reverse incidence direction, that is, incidence on the microlenses 623, shows a greater angular distribution than the forward incidence direction, the angle range is ±20°, which is too small compared to a case of using a diffusive plate and three units of diffusive films, and thus, practical use of an LCD in this case is difficult. Also, since the angle range for the forward incidence direction is ±10°, practical use of an LCD in this case is difficult.

Figure 12:
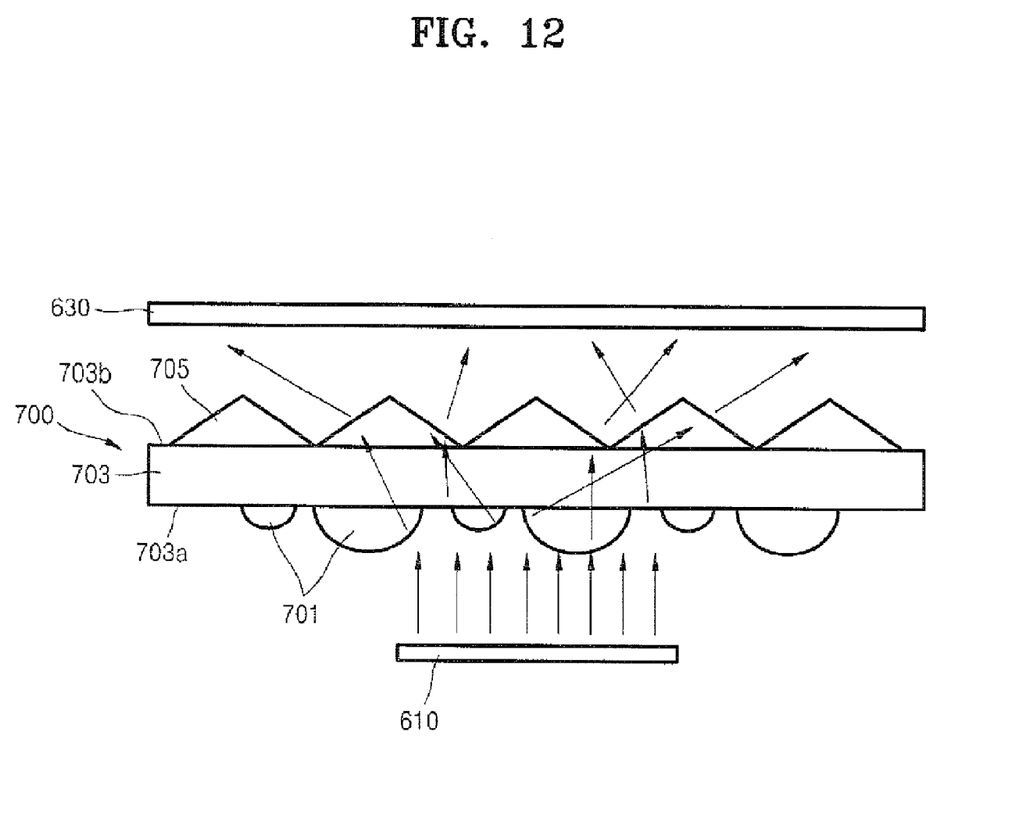
FIG. 12 shows a detection structure for analyzing the light intensity with respect to the emission angle of exit light when a wide angle diffuser according to an exemplary embodiment of the present invention has a plurality of spherical or aspherical hemispherical microlenses having different sizes on an incident surface and a plurality of prisms having the same apex angle and no plane portion on an exit surface.

FIG. 12 shows a detection structure for analyzing the light intensity with respect to the emission angle of exit light when a wide angle diffuser 700 according to the present invention has a plurality of spherical or aspherical hemispherical microlenses 701 having different sizes on an incident surface 703a and a plurality of prisms 705 having the same apex angle and no plane portion on an exit surface 703b. In FIG. 12, the wide angle diffuser 700 is a low-surface-lens module having a lens on a lower surface thereof, which corresponds to the comparative example described with reference to FIGS. 10 and 11 in which, for the reverse incidence direction, the light passes through the microlenses and is then incident on the transparent plate.

Figure 13:
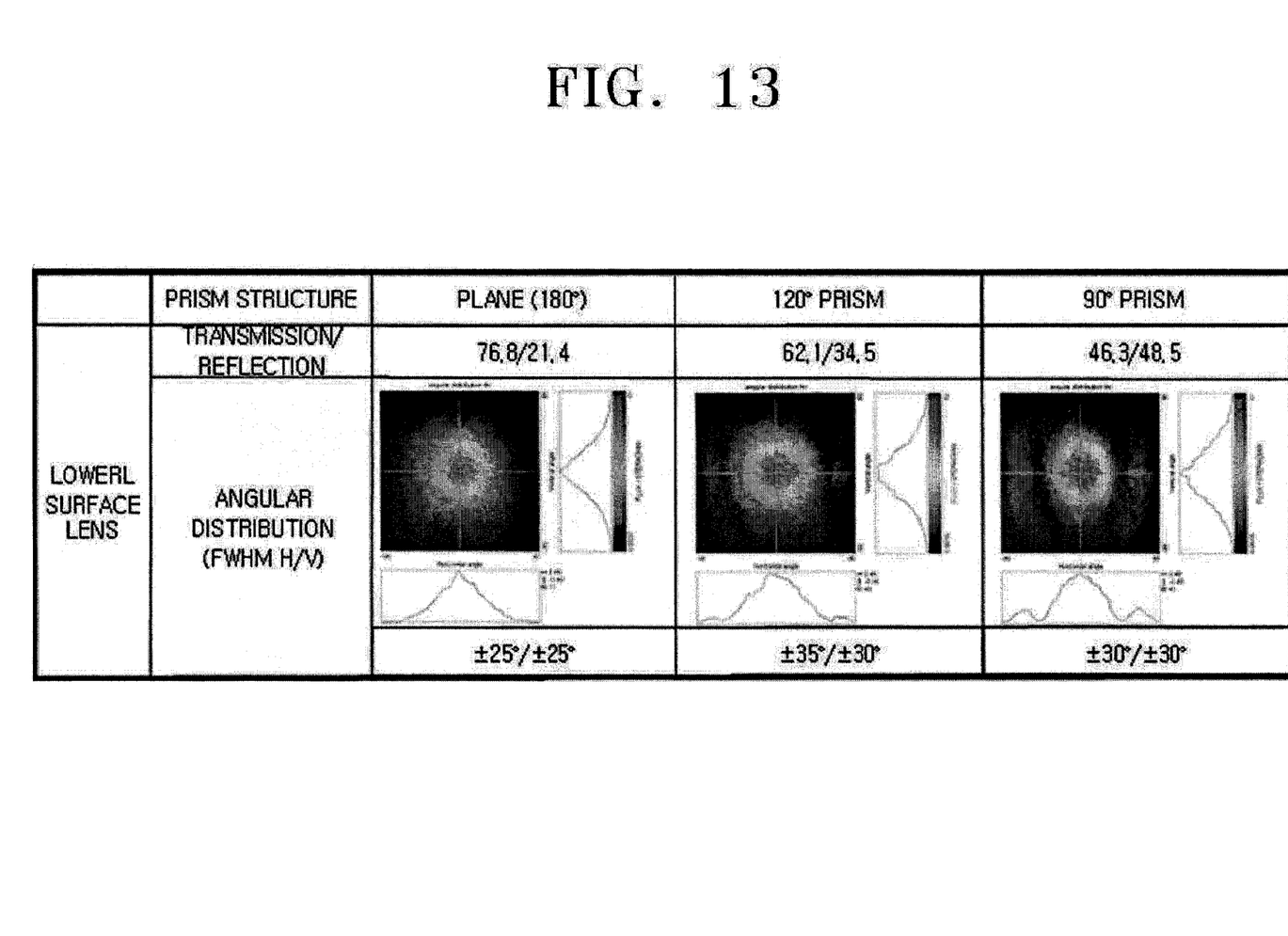
FIG. 13 shows the light distribution, the light intensity distribution with respect to the emission angle in the horizontal and vertical directions, the emission angle range satisfying the full width at half maximum (FWHM) of the light intensity distribution, and the transmission/reflection degree when all light is perpendicularly incident on the wide angle diffuser and the apex angles of prisms in the wide angle diffuser of FIG. 12 are respectively 180° (a plane), 120°, and 90°.

FIG. 13 shows the light distribution, the light intensity distribution with respect to the emission angle in the horizontal and vertical directions, the emission angle range satisfying the full width at half maximum (FWHM) of the light intensity distribution, and the transmission/reflection degree when the effective size of the surface light source 610 is the same as that in the comparative example of FIG. 10 and all light is perpendicularly incident on the wide angle diffuser 700 and the apex angles of the prisms 705 in the wide angle diffuser 700 of FIG. 12 are respectively 180° (a plane), 120°, and 90°. Referring to FIG. 13, when the apex angles of the prisms 705 are 120° and 90°, the emission angle range in the horizontal (H) and vertical (V) directions satisfying the FWHM of the light intensity distribution are ±35°/±30° and ±30°/±30° so that an emission angle range that is much larger than the emission angle range of ±20° satisfying the FWHM of the light intensity distribution for the reverse incidence direction in the comparative example described with reference to FIGS. 10 and 11 can be obtained. Also, an angle range much larger than ±25°/±25° when the apex angle of the prisms 705 is 180° (a plane) can be obtained.

Figure 14:
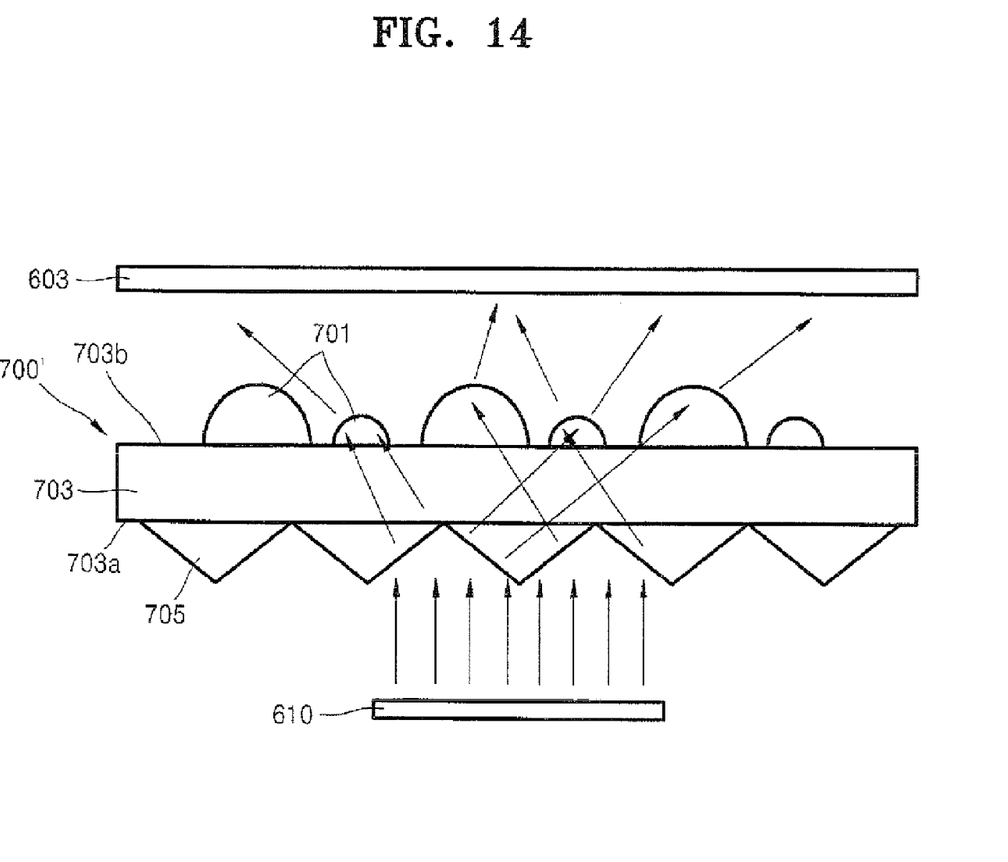
FIG. 14 shows a detection structure for analyzing the light intensity distribution with respect to the emission angle of exit light when a wide angle diffuser according to an exemplary embodiment of the present invention has a plurality of prisms having the same apex angle and no plane portion on an incident surface and having a plurality of hemispherical microlenses having different sizes on an exit surface.

FIG. 14 shows a detection structure for analyzing the light intensity distribution with respect to the emission angle of exit light when a wide angle diffuser 700' according to the present invention has the prisms 705 having the same apex angle and no plane portion on the incident surface 703a and having the hemispherical microlenses 701 having different sizes on the exit surface 703b. The wide angle diffuser 700' is an upper-surface-lens module having a lens on an upper surface thereof and corresponds to a case that light is input in the forward direction in the comparative example.

Figure 15:
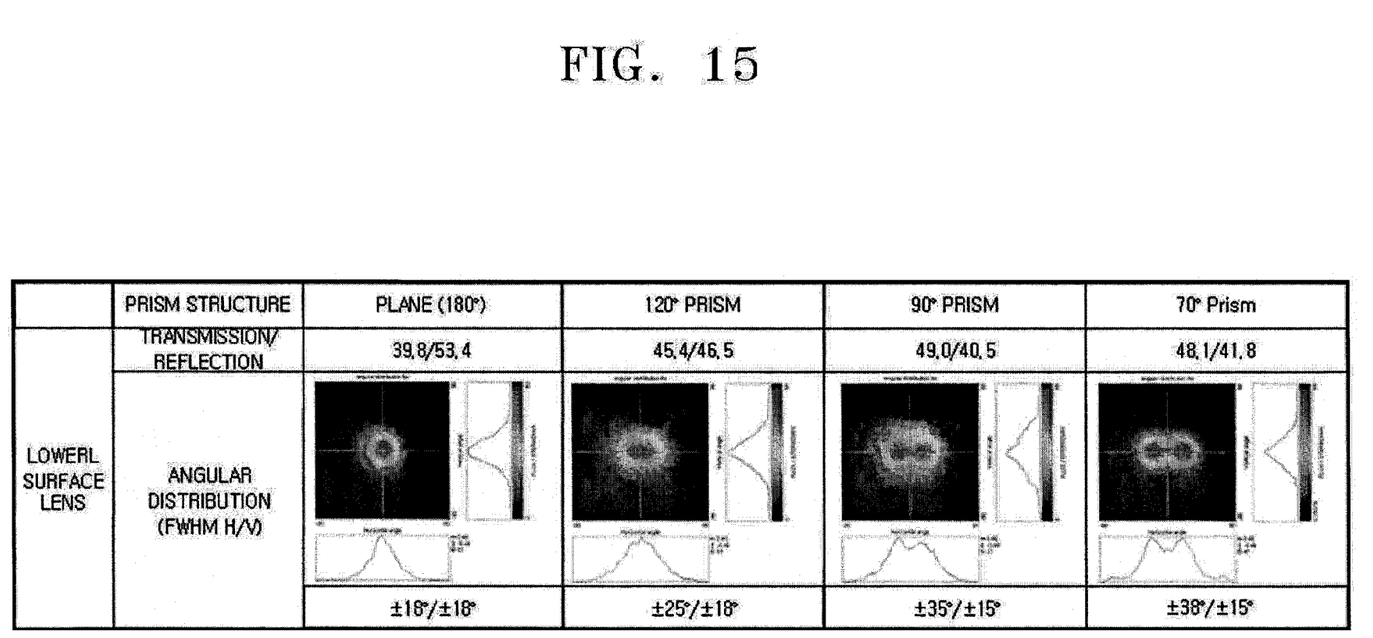
FIG. 15 shows the light distribution, the light intensity distribution with respect to the emission angle in the horizontal and vertical directions, the emission angle range satisfying the full width at half maximum (FWHM) of the light intensity distribution, and the transmission/reflection degree when all light is perpendicularly incident on the wide angle diffuser and the apex angles of prisms in the wide angle diffuser of FIG. 14 are respectively 180° (a plane), 120°, 90°, and 70°.

FIG. 15 shows the light distribution, the light intensity distribution with respect to the emission angle in the horizontal and vertical directions, the emission angle range satisfying the full width at half maximum (FWHM) of the light intensity distribution, and the transmission/reflection degree when the effective size of the surface light source 610 is the same as that of the comparative example of FIG. 10 and all light is perpendicularly incident on the wide angle diffuser 700' and the apex angles of the prisms 705 in the wide angle diffuser 700' of FIG. 14 are respectively 180° (a plane), 120°, 90°, and 70°. Referring to FIG. 15, when the apex angles of the prisms 705 are 120°, 90°, and 70°, the emission angle range in the horizontal (H) and vertical (V) directions satisfying the FWHM of the light intensity distribution are ±25°/±18°, ±35°/+15°, and ±38°/+15° so that an emission angle range that is much larger than the emission angle range of ±10° satisfying the FWHM of the light intensity distribution for the forward incidence direction in the comparative example described with reference to FIGS. 10 and 11 can be obtained. Also, an angle range in the horizontal direction much larger than ±18°/±18° when the apex angle of the prisms 705 is 180° (a plane) can be obtained.

Figure 16:
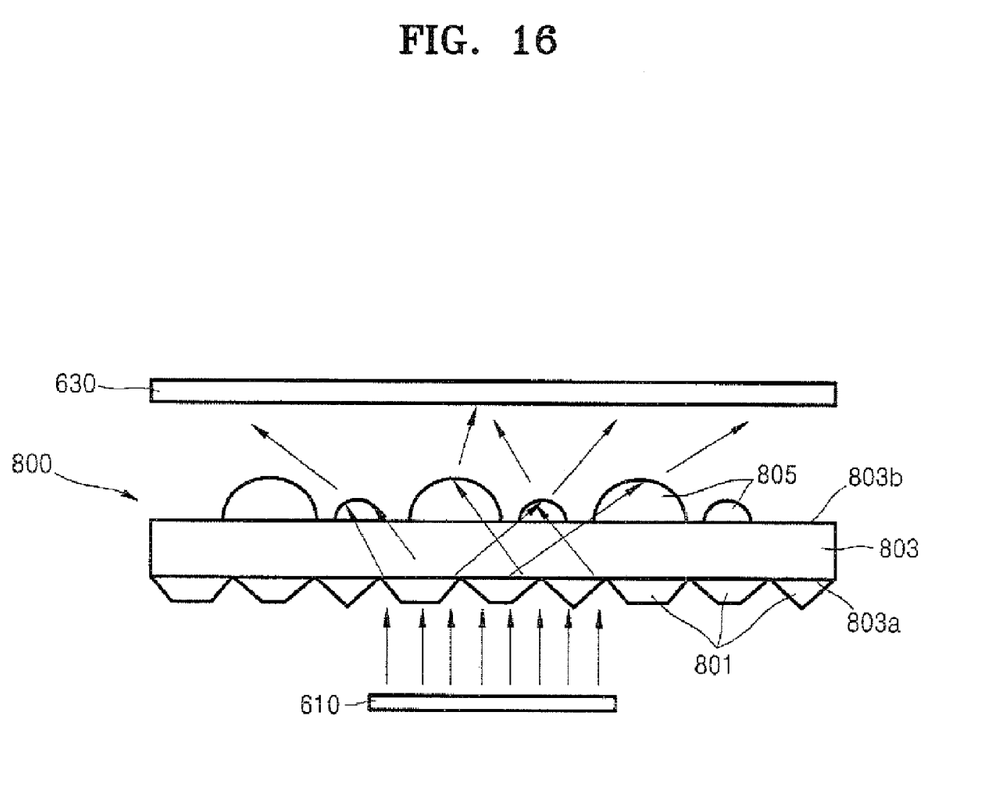
FIG. 16 shows a detection structure for analyzing the light intensity distribution with respect to the emission angle of exit light when a wide angle diffuser according to an exemplary embodiment of the present invention has a plurality of prisms having different apex angles on an incident surface and having a plurality of hemispherical microlenses having different sizes on an exit surface.

FIG. 16 shows a detection structure for analyzing the light intensity distribution with respect to the emission angle of exit light when a wide angle diffuser 800 according to the present invention has a plurality of prisms 801 having different apex angles on an incident surface 803a and having a plurality of hemispherical microlenses 805 having different sizes on an exit surface 803b. In FIG. 16, the wide angle diffuser 800 is an upper surface lens module having a lens on the upper surface thereof and corresponds to a case where light is incident in the forward direction in a comparative example.

Figure 17A:
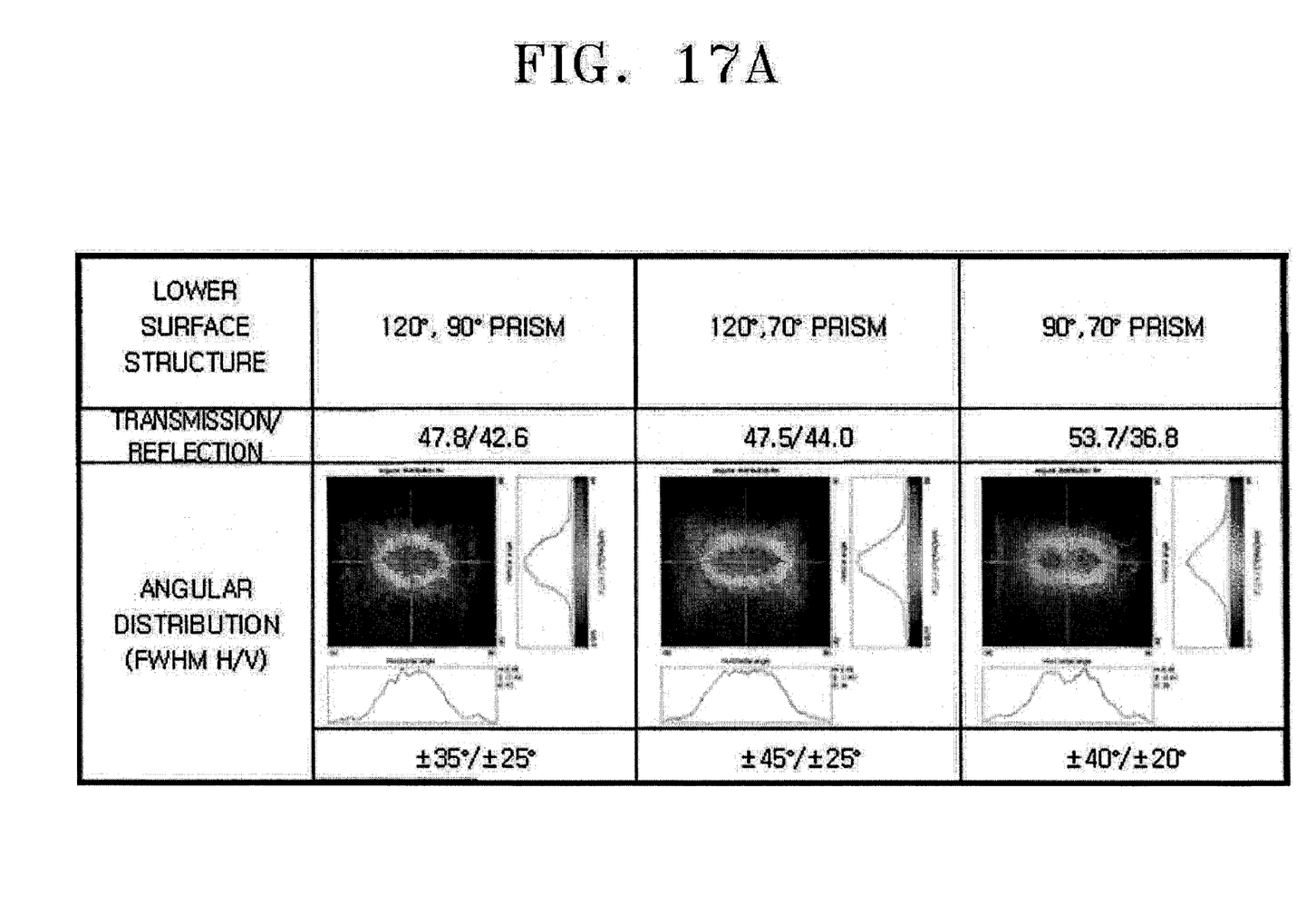
FIG. 17A shows the light distribution, the light intensity distribution with respect to the emission angle in the horizontal and vertical directions, the emission angle range satisfying the full width at half maximum (FWHM) of the light intensity distribution, and the transmission/reflection degree when all light is perpendicularly incident on the wide angle diffuser, the apex angles of prisms in the wide angle diffuser are combinations of 120° and 90°, 120° and 70°, and 90° and 70°, and the prism has no plane portion.

FIG. 17A shows the light distribution, the light intensity distribution with respect to the emission angle in the horizontal and vertical directions, the emission angle range satisfying the full width at half maximum (FWHM) of the light intensity distribution, and the transmission/reflection degree when the effective size of the surface light source 610 is the same as the comparative example of FIG. 10, all light is perpendicularly incident on the wide angle diffuser 800, the apex angles of prisms 801 in the wide angle diffuser 800 are combinations of 120° and 90°, 120° and 70°, and 90° and 70°, and the prism 801 has no plane portion.

Figure 17B:
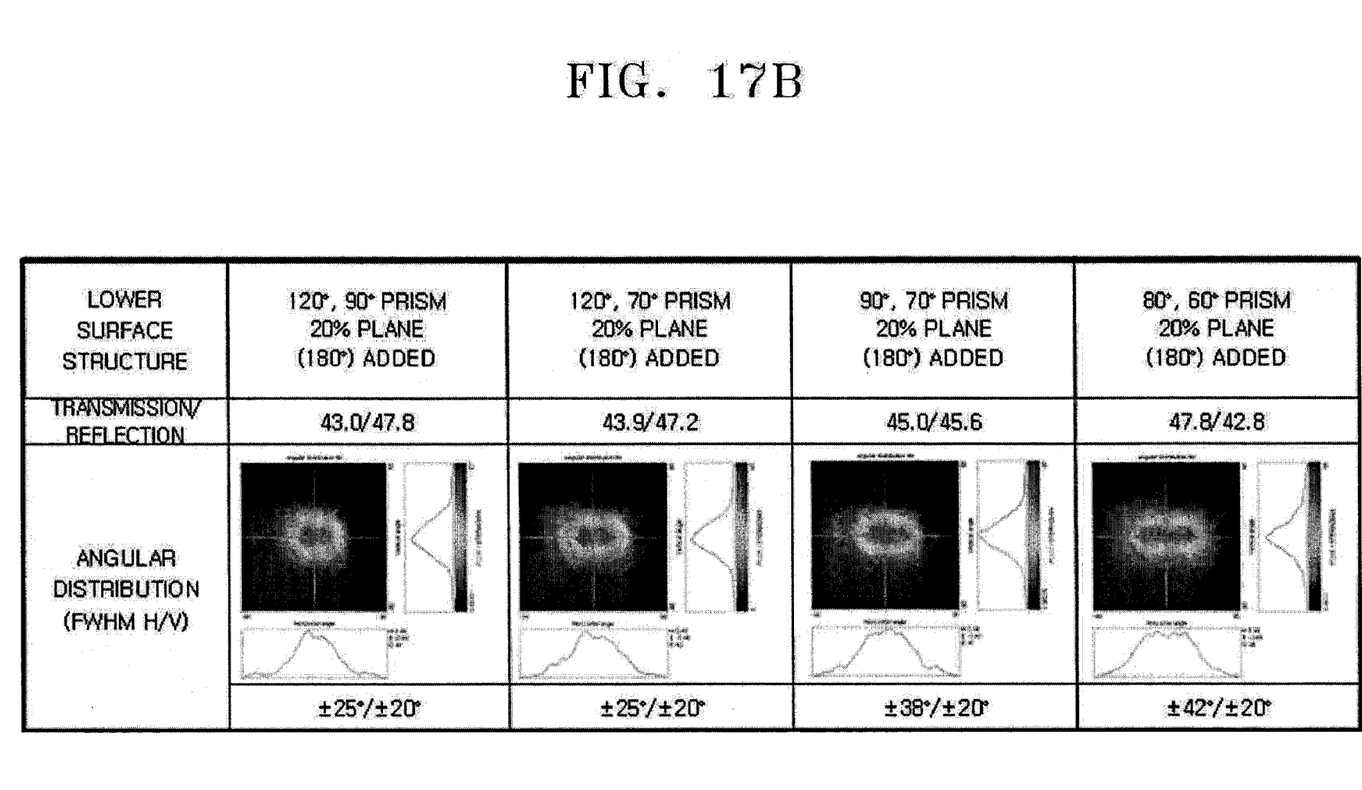
FIG. 17B shows the light distribution, the light intensity distribution with respect to the emission angle in the horizontal and vertical directions, the emission angle range satisfying the full width at half maximum (FWHM) of the light intensity distribution, and the transmission/reflection degree when all light is perpendicularly incident on the wide angle diffuser, the apex angles of prisms in the wide angle diffuser are combinations of 120° and 90°, 120° and 70°, 90° and 70°, and 80° and 60, and 20% of the prism has a plane portion, that is, when a 20% plane (180°) is added compared to FIG. 17A.

FIG. 17B shows the light distribution, the light intensity distribution with respect to the emission angle in the horizontal and vertical directions, the emission angle range satisfying the full width at half maximum (FWHM) of the light intensity distribution, and the transmission/reflection degree when the effective size of the surface light source 610 is the same as that of the comparative example of FIG. 10, all light is perpendicularly incident on the wide angle diffuser 800, the apex angles of the prisms 801 in the wide angle diffuser 800 are combinations of 120° and 90°, 120° and 70°, 90° and 70°, and 80° and 60°, and 20% of the prisms 801 has the plane portion, that is, when a 20% plane (180°) is added compared to FIG. 17A.

Referring to FIG. 17A, when the apex angles of the prisms 801 are combinations of 120° and 90°, 120° and 70°, and 90° and 70°, the emission angle range in the horizontal (H) and vertical (V) directions satisfying the FWHM of the light intensity distribution are ±35°/±25°, ±45°/±25°, and ±40°/±20° so that an emission angle range that is much larger than the emission angle range of ±10° satisfying the FWHM of the light intensity distribution for the forward incidence direction in the comparative example described with reference to FIGS. 10 and 11 can be obtained.

Referring to FIG. 17B, when the apex angles of the prisms 801 are combinations of 120° and 90°, 120° and 70°, 90° and 70°, and 80° and 60° and a 20% plane (180°) is added, the emission angle range in the horizontal (H) and vertical (V) directions satisfying the FWHM of the light intensity distribution are ±25°/±20°, ±25°/±20°, ±38°/±20°, and ±42°/±20° so that an emission angle range that is much larger than the emission angle range of ±10° satisfying the FWHM of the light intensity distribution for the forward incidence direction in the comparative example described with reference to FIGS. 10 and 11 can be obtained.

The above-described simulation results are merely examples so that the wide angle diffuser 110 according to the present invention is not limited thereto. Thus, a variety of designs of the emission angle range satisfying the FWHM of the light intensity distribution with respect to the design conditions are possible.

As can be seen from the simulation results, the wide angle diffuser having a structure in which a plurality of prisms are arranged on a surface of a transparent plate and a plurality of microlenses on the other surface thereof has an emission angle range satisfying the FWHM of the light intensity distribution much larger than the diffuser having a plurality of microlenses on only one surface thereof used as a comparative example. That is, a sufficient diffusion angle can be obtained by the wide angle diffuser according to the present invention.

Thus, when the wide angle diffuser according to the present invention is used, the light collimated and passing through a liquid crystal panel is well diffused so that a viewing angle large enough to realize the same quality image in any direction can be obtained. That is, according to the LCD employing the wide angle diffuser according to the present invention, since the collimated light is emitted from the backlight unit to the liquid crystal panel and the light passing through the liquid crystal panel is diffused by the wide angle diffuser, a light beam can be diffused at all angles so that a large viewing angle, and a very uniform contrast distribution in all direction can be obtained.

Also, according to the LCD employing the wide angle diffuser according to the present invention, since the collimated light can be used, the transmissivity characteristic can be improved so as to achieve a high efficiency and the structure of the liquid crystal panel can be simplified. Furthermore, the glare or deterioration of contrast due to external light can be prevented by the wide angle diffuser located above the liquid crystal panel.

Also, since the wide angle diffuser is disposed above the liquid crystal panel, the wide angle diffuser can function as a protection layer of the liquid crystal panel. Furthermore, when a plurality of prisms which at least some of the prisms have a plane portion are arranged on a surface facing the liquid crystal panel of the wide angle diffuser, since the wide angle diffuser can be attached to the liquid crystal panel by the plane portion, the polarization plate of the liquid crystal panel is prevented from being scratched by the edges of the prisms so that reliability can be improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A wide angle diffuser comprising:
    a plate-shaped body comprising an incident surface on which light is incident and an exit surface through which light is emitted from the plate-shaped body, wherein the plate-shaped body has a uniform thickness;
    a plurality of microlenses disposed on one of the incident surface and the exit surface, wherein the plurality of microlenses comprise microlenses of two or more different sizes; and
    a plurality of prisms which diffuse light, disposed on the one of the incident surface and the exit surface on which the plurality of microlenses is not disposed, wherein the plurality of prisms comprise two or more prisms having a truncated pyramid shape different from each other and at least one prism having a pyramid shape.

2. The wide angle diffuser of claim 1, wherein the plurality of microlenses have spherical or aspherical surfaces.

3. The wide angle diffuser of claim 2, wherein the plurality of microlenses are hemispherical lenses having spherical or aspherical surfaces.

4. The wide angle diffuser of claim 1, wherein at least one of the plurality of prisms comprises a plane portion substantially parallel to the plate-shaped body.

5. A liquid crystal display comprising:
    a liquid crystal panel;
    a backlight unit, disposed on a rear surface of the liquid crystal panel, which emits collimated light to the liquid crystal panel; and
    a wide angle diffuser which diffuses light incident thereon from the liquid crystal panel,
    wherein the wide angle diffuser comprises:
    a plate-shaped body comprising an incident surface on which light is incident and an exit surface through which light is emitted from the plate-shaped body, wherein the plate-shaped body has a uniform thickness,
    a plurality of microlenses disposed on one of the incident surface and the exit surface, wherein the plurality of microlenses comprise microlenses of two or more different sizes, and
    a plurality of prisms, which diffuse light passing therethrough, disposed on the one of the incident surface and the exit surface on which the plurality of microlenses is not disposed, wherein the plurality of prisms comprise two or more prisms having a truncated pyramid shape different from each other and at least one prism having a pyramid shape.

6. The liquid crystal display of claim 5, wherein the plurality of microlenses have spherical or aspherical surfaces.

7. The liquid crystal display of claim 6, wherein the plurality of microlenses are hemispherical lenses having spherical or aspherical surfaces.

8. The liquid crystal display of claim 5, wherein the plurality of prisms are disposed on the incident surface, and the microlenses are disposed on the exit surface.

9. The liquid crystal display of claim 8, wherein at least one of the plurality of prisms comprises a plane portion substantially parallel to the plate-shaped body.

10. The liquid crystal display of claim 9, further comprising an adhesive layer attaching the prisms of the wide angle diffuser to the liquid crystal panel.

11. The liquid crystal display of claim 9, further comprising an optical coating layer disposed on the microlenses of the wide angle diffuser.

12. The liquid crystal display of claim 9, further comprising:
   an adhesive layer which attaches the prisms of the wide angle diffuser to the liquid crystal panel; and
   an optical coating layer disposed on the microlenses of the wide angle diffuser.

13. The liquid crystal display of claim 5, wherein the plurality of microlenses are disposed on the incident surface, and the plurality of prisms are disposed on the exit surface.

14. The liquid crystal display of claim 13, wherein at least one of the plurality of prisms comprises a plane portion substantially parallel to the plate-shaped body.

15. The liquid crystal display of claim 14, wherein at least one of the plurality of prisms has a truncated pyramid shape.

16. The liquid crystal display of claim 13, further comprising an optical coating layer disposed on the prisms of the wide angle diffuser.

* * * * *